United States Patent [19]

Shin et al.

[11] Patent Number: 4,772,954
[45] Date of Patent: Sep. 20, 1988

[54] COPYING MACHINE

[75] Inventors: Keizou Shin, Munakata; Hiroshi Sakamoto, Fukuoka; Tadashi Yamaguchi, Fukuoka; Terumichi Nakayama, Fukuoka; Toshihiro Torigoe, Kasuya; Yoshihiro Motomura, Fukuoka, all of Japan

[73] Assignee: Matsushita Electric Industrial Co., Ltd., Osaka, Japan

[21] Appl. No.: 706,886

[22] Filed: Mar. 1, 1985

[30] Foreign Application Priority Data

| Mar. 1, 1984 | [JP] | Japan | 59-39805 |
| Mar. 1, 1984 | [JP] | Japan | 59-39806 |
| Mar. 2, 1984 | [JP] | Japan | 59-41136 |
| Mar. 5, 1984 | [JP] | Japan | 59-41549 |

[51] Int. Cl.⁴ .................................................. H04N 1/00
[52] U.S. Cl. .................................. 358/256; 358/285; 358/293; 382/59; 346/76 PH
[58] Field of Search ............... 358/256, 293, 282, 285; 382/59; 355/82, 84; 346/76 PH

[56] References Cited

U.S. PATENT DOCUMENTS

| 3,064,077 | 11/1962 | Cary | 358/286 |
| 3,840,701 | 10/1974 | Tomii et al. | 358/294 X |
| 3,976,973 | 8/1976 | Martin et al. | 382/59 X |
| 4,061,380 | 12/1977 | Carnahan et al. | 382/59 X |
| 4,142,214 | 2/1979 | Yanajali et al. | 358/265 X |
| 4,264,396 | 4/1981 | Stewart | 346/76 PH |
| 4,317,137 | 2/1982 | Tompkins | 358/286 |
| 4,319,283 | 3/1982 | Ozawa et al. | 358/286 |
| 4,421,406 | 12/1983 | Feinleit | 355/84 |
| 4,472,710 | 9/1984 | Suzuki et al. | 382/59 X |
| 4,523,235 | 6/1985 | Rajchman | 346/76 PH |
| 4,574,317 | 3/1986 | Scheible | 358/286 |

OTHER PUBLICATIONS

IBM Technical Disclosure Bulletin; vol. 19, No. 1, Jun. 1976, E. Uberlacher, *Read/Write Stylus.*
Copy-Jack 40, "Hand Copy Machine", Plus Corporation, 20-11 Otowa 1-chome, Bunkyo-ku, Tokyo 112, Japan, Copyright 1986.
Porta Copy, Instruction Manual, Silver Reed America Inc., 19600 South Vermont Avenue, Torrance, Calif. 90502, publication date unknown.

*Primary Examiner*—Edward L. Coles, Sr.
*Attorney, Agent, or Firm*—Wenderoth, Lind & Ponack

[57] ABSTRACT

A small-size copying machine has an image sensor and a print head for printing image information or visible data on copying paper. The copying machine is moved over an original document to read the visible data with the image sensor, and the visible data read by the image sensor is printed by the print head on the copying paper. The reading of the visible data with the image sensor is synchronized with the printing of the visible data onto the copying paper with the print head by fixing an end of the copying paper discharged from the copying machine and moving the copying machine with respect to the original document. The distance from the position where the visible data of the original document is read to an outlet slit for discharging the copying paper therethrough is equal to the distance from the position where the visible data is printed by the print head on the copying machine to the outlet slit, so that the data printed on the copying paper and the image of the original document will be overlapped. The copying machine may have a tapered body portion with a reading slit defined therein for facilitating the reading of the original document with the copying machine. The copying machine may have an inclined bottom panel for allowing the copying machine to be moved easily over the original document. The copying machine may also have on sides thereof markings for indicating a width and a position where the original document is to be copied.

21 Claims, 5 Drawing Sheets

COPYING MACHINE

BACKGROUND OF THE INVENTION

The present invention relates to a copying machine for printing data read by a one-dimensional image sensor on a thermosensitive sheet with a thermal printer.

Copying machines in most widespread use today employ the Carlson process for copying image data on plane paper. The electrophotographic copying machines of this type require a high-voltage power supply for charging a photosensitive drum. It would be difficult to produce a portable electrophotographic machine because of a high power consumption rate necessitated by a heater for fixing toner images. The copying machines which operate based on the Carlson process must be maintained or serviced periodically by supplying toner and cleaning the photosensitive drum, for example. since these copying machines are generally heavy and large in size, they are incapable of copying characters written on a wall, for example. The copying machines require various components such as the photosensitive drum, a charger for charging the photosensitive drum, a driver unit for driving the photosensitive drum, and a driver unit for feeding sheets of copying paper, for example. Inasmuch as these parts are expensive in general, the electrophotographic copying machines are costly to manufacture and hence are inappropriate for personal use.

SUMMARY OF THE INVENTION

This invention has been developed for the purpose of obviating all the aforesaid disadvantages of the prior art.

It is an object of the present invention to provide a copying machine suitable for personal use, which is small enough in size and so lightweight that it can be easily held by hand and has such a small power requirement that it can be battery-operated.

Another object of the present invention is to provide a copying machine for producing a copied image directly above the image of an original document.

Still another object of the present invention is to provide an copying machine capable of easily reading or copying an original document at a position where it is desired to be read or copied.

A still further object of the present invention is to provide a copying machine which can easily be operated for reading or copying an original document.

A yet further object of the present invention is to provide a copying machine which allows a position where an original document is read or copied to be readily identified.

According to the present invention, there is provided a copying machine including a housing, an image sensor disposed in the housing for sensing image information of an original document to be copied, print means responsive to an output from the image sensor for applying the image information to copying paper, the housing having an opening for aloowing the copying paper to be discharged out of the housing through the opening, the opening being defined in the vicinity of a portion of the housing which confronts the original document, the housing and the copying paper being relatively movable for a first interval in a manner to cause the copying paper to pass across and over the print means for a second interval related to the first interval, for thereby copying the image information of the original document on the copying paper. The opening may be spaced from the print means by a distance which is equal to the distance from the opening to a position in which the image information of the original document is sensed by the image sensor. The portion of the housing which confronts the original document may be thinner than the rest of the housing, or may be inclined with respect to the rest of the housing. The housing may be marked on sides thereof with indicia for indicating a width and a positon of the image information sensed by the image sensor.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Like or corresponding parts are denoted by like or corresponding reference characters throughout the figures.

The principles of a copying machine according to the present invention are the same as the principles of a telecopier in that data read by a one-dimensional image sensor is printed on a sheet of thermosensitive paper by a thermal printer.

Figure 1:
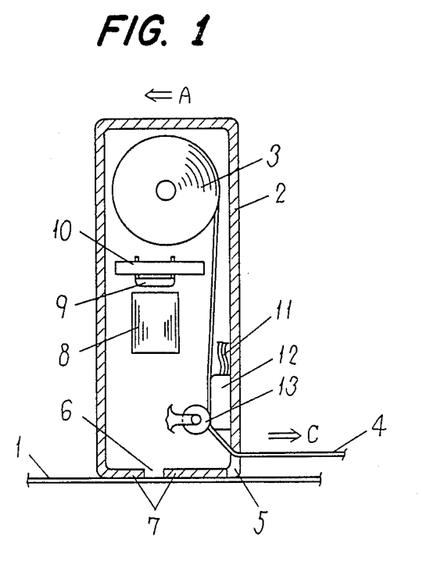
FIG. 1 is a sectional side elevational view of a copying machine according to a first embodiment of the present invention.

FIG. 1 shows in cross section a copying machine, designated at 2 which comprises a generally rectangular housing formed from two large rectangular panels with four narrow rectangular panels extending therebetween, according to a first embodiment of the present invention. The copying machine 2 is placed on an original document 1 such as a sheet of newspaper. A roll 3 of copying media, such as copying paper, is accommodated in an upper end of the housing of the copying machine 2 by a copying media holding means, the copying paper 3 having a leading end 4 led out of the copying machine 2 through an opening or outlet slit 5 defined in a rear panel of the copying machine 2. The copying paper 3 preferably comprises thermosensitive paper.

The copying machine 2 includes a bottom panel 7 which forms an angle with the rear panel, the bottom end panel 7 having a narrow, rectangular reading slit 6 defined therein. Image information from the image of the original document 1 as seen through the reading slit 6 is focused through a lens barrel 8, fixedly held in the housing between the reading slit 6 and the copying paper holding means, onto a one-dimensional line image sensor 9 fixedly held in the housing between the lens barrel and the copying paper hoilding means. The one-dimensional image sensor 9 preferably comprises a charge-coupled device.

The image sensor 9 is fixedly supported on a baseboard 10. An output signal produced by the image sensor 10 is applied over a cord 11 to a line print means, such as a print head 12 comprising a thermal print head fixedly secured to an inner surface of the rear panel adjacent to the outlet slit. The copying paper 3 is pressed against the print head 12 by platen means, such as a platen 13 disposed in the housing adjacent the print head.

The copying machine according to the first embodiment will be used as follows: The copying machine 2 is placed on the original document 1. While the leading end 4 of the copying paper 3 is held against the original document 1 with one hand, the copying machine 2 is moved with the other hand to scan the reading slit 6 over the original document 1. At the same time, the copying paper 3 is pulled out of the copying machine 2 for a length equal to the interval or distance that the copying machine 2 is moved.

During the above operation, the document is illuminated bu suitable means such as by external lighting of the document from below or by internal lighting of the document from above by illumination means within the housing so that data on the original document 1 is optically delivered through the reading slit 6 and focused by the lens barrel 8 onto the image sensor 9, which converts the optical data into serial electric signals. The serial electric signals are then fed over the cord 11 to the print head 12 which thermally records the signals on the copying paper 3. The principles of the above copying operation are known in the telecopier art.

Since the copying machine 2 is moved with the leading end 4 of the copying paper 3 held down against the original document 1, the speed at which the image sensor 9 reads data on the original document 1 is the same as the speed at which the copying paper 3 is fed across and over the print head 12.

A copying machine according to a second embodiment will be described with reference to FIGS. 2 and 3. According to the second embodiment, the distance C from the reading slit 6 to the outlet slit 5 is equal to the distance D from the platen 13 to the outlet slit 5.

Figure 2:
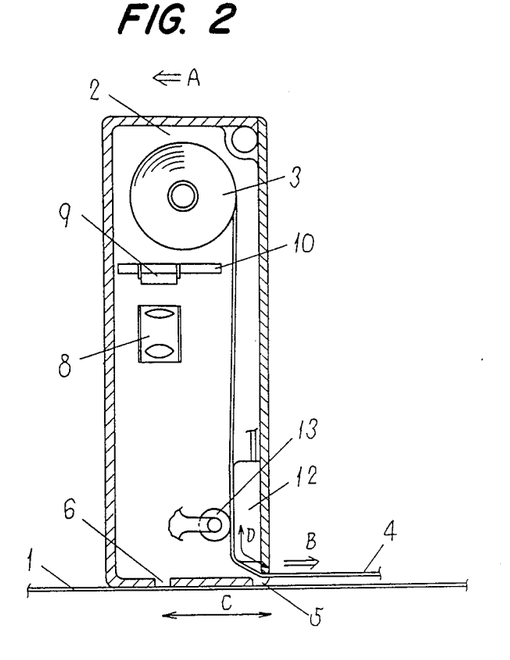
FIG. 2 is a sectional side elevational view of a copying machine according to a second embodiment of the present invention.
Figure 3:
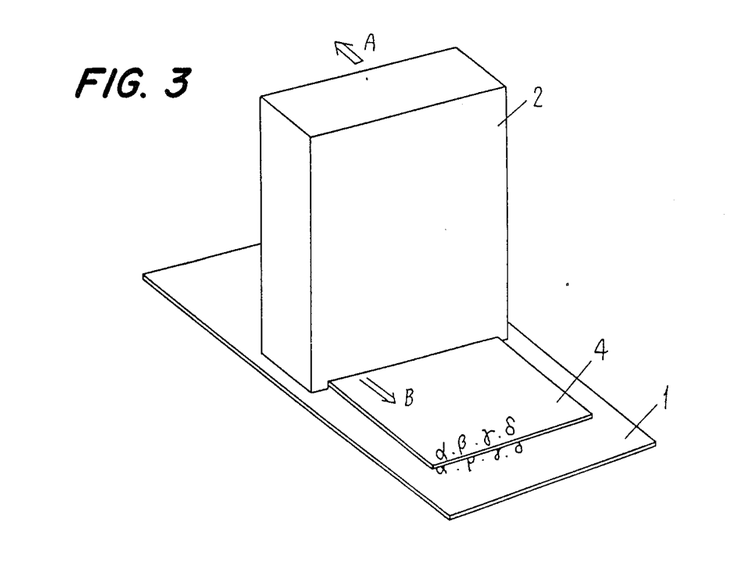
FIG. 3 is a perspective view of the copying machine shown in FIG. 2.

In the copying machine of FIGS. 2 and 3, image data read by the image sensor 9 through the reading slit 6 is printed at the position of the paten 13 by the print head 12. Since the distances C, D are equal to each other, the image of the original document 1 and the copied image on the copying paper 3 placed on the original document 1 are overlapped.

Figure 4:
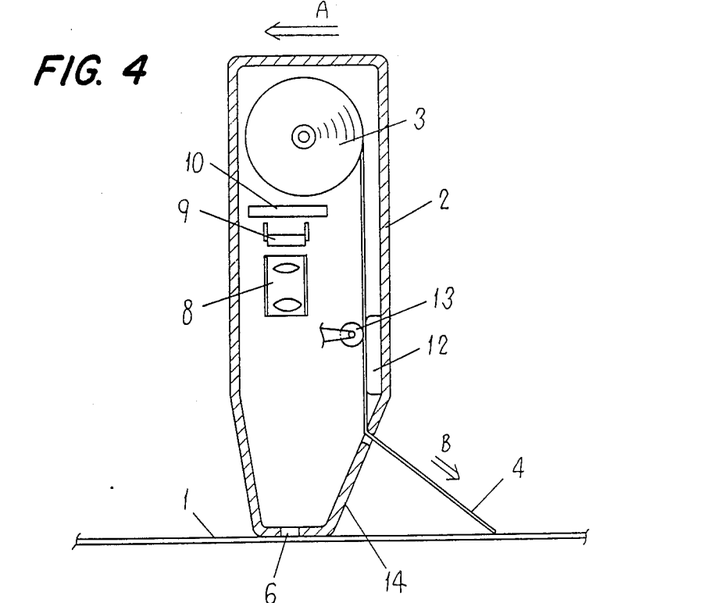
FIG. 4 is a sectional side elevational view of a copying machine according to a third embodiment of the present invention.
Figure 5:
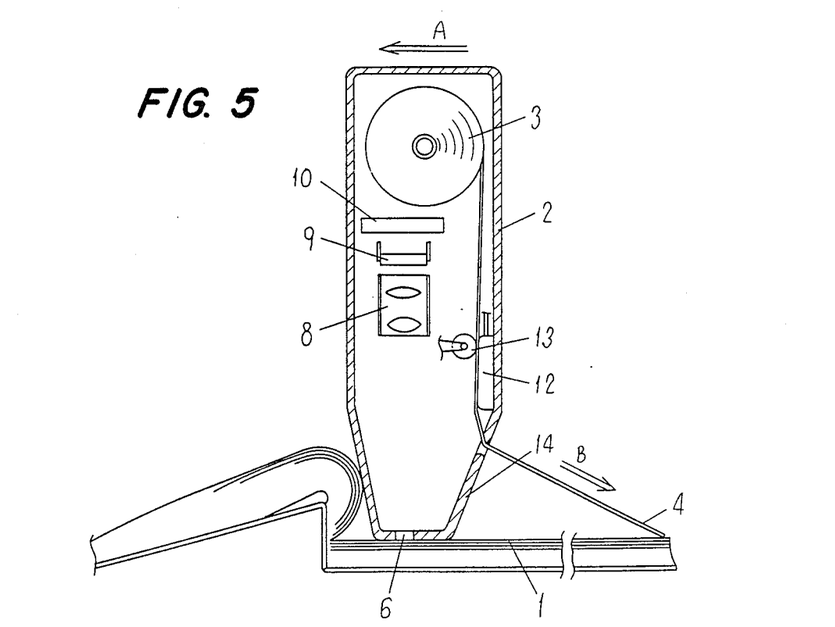
FIG. 5 is a perspective view showing the manner in which the copying machine is used.

FIGS. 4 and 5 illustrate a copying machine according to a third embodiment of the present invention. The copying machine of the third embodiment includes a downwardly tapered end portion 14 for contact with the original document 1, the end portion 14 being thinner in cross section taken in a plane which is parallel to the surface of the original document than the rest of the housing of the copying machine. Even when the original document 1 is a thick book, as shown, the tapered end portion 14 allows the copying machine to scan a desired page fully from edge to edge.

Figure 6:
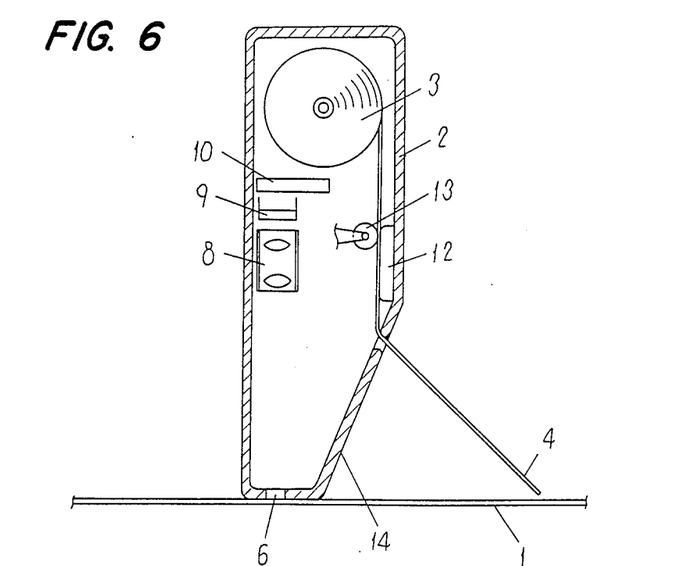
FIG. 6 is a sectional side elevational view of a copying machine according to a fourth embodiment of the present invention.

Although the tapered end portion 14 of the copying machine 2 of the third embodiment has both a front and rear surface slanted towards each other as shown in FIGS. 4 and 5, the end portion 14 may be tapered with only a rear surface thereof slanted as shown in FIG. 6 such that the lower end of the rear panel forms an obtuse angle with the bottom end panel which illustrates a fourth embodiment of the present invention. The portions of the copying machine of the fourth embodiment other than the slanted rear surface are exactly the same as those of the copying machine of the third embodiment. since the end portion 14 is tapered, the copying machine can bring the reading slit 6 into accurate alignment with a portion of the original document 1 which is desired to be copied.

Figure 7:
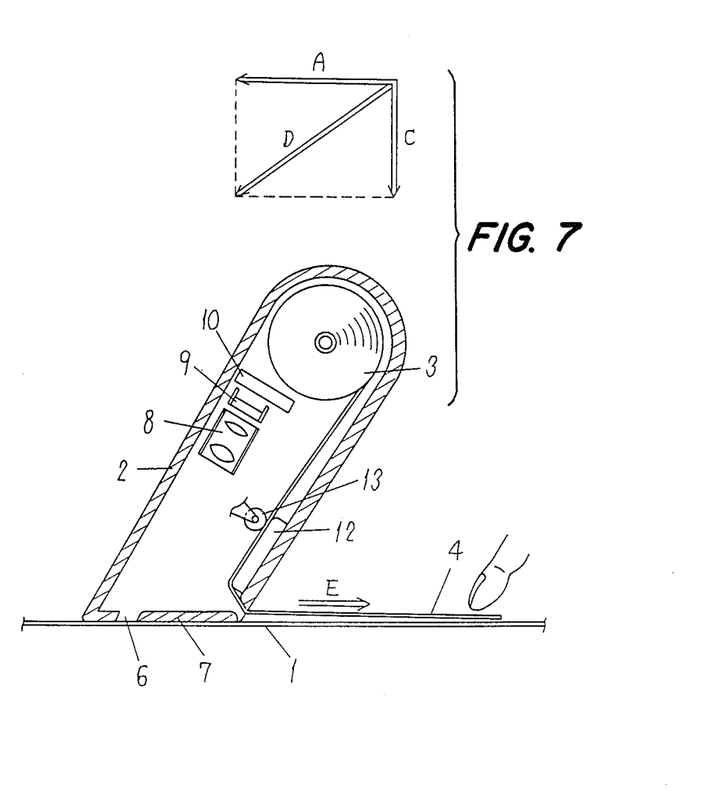
FIG. 7 is a sectional side elevational view of a copying machine according to a fifth embodiment of the present invention.

FIG. 7 shows a copying machine according to a fifth embodiment of the present invention, which has a slanted bottom panel 7 with respect to the parallel opposite front and rear sides of the housing. The other portions of the copying machine shown in FIG. 7 are identical to those of the first through fourth embodiments.

When the copying machine 2 is moved in the direction of the vector A (FIG. 7), the copying machine 2 is subjected to a load applied in the direction of force represented by the vector C. The vectors A and C are combined to produce a composite vector D. Since the copying machine 2 is inclined, its axis extends substantially parallel to the composite vector D, with the result that the copying machine 2 can easily be moved in the direction of the vector A.

Figure 8:
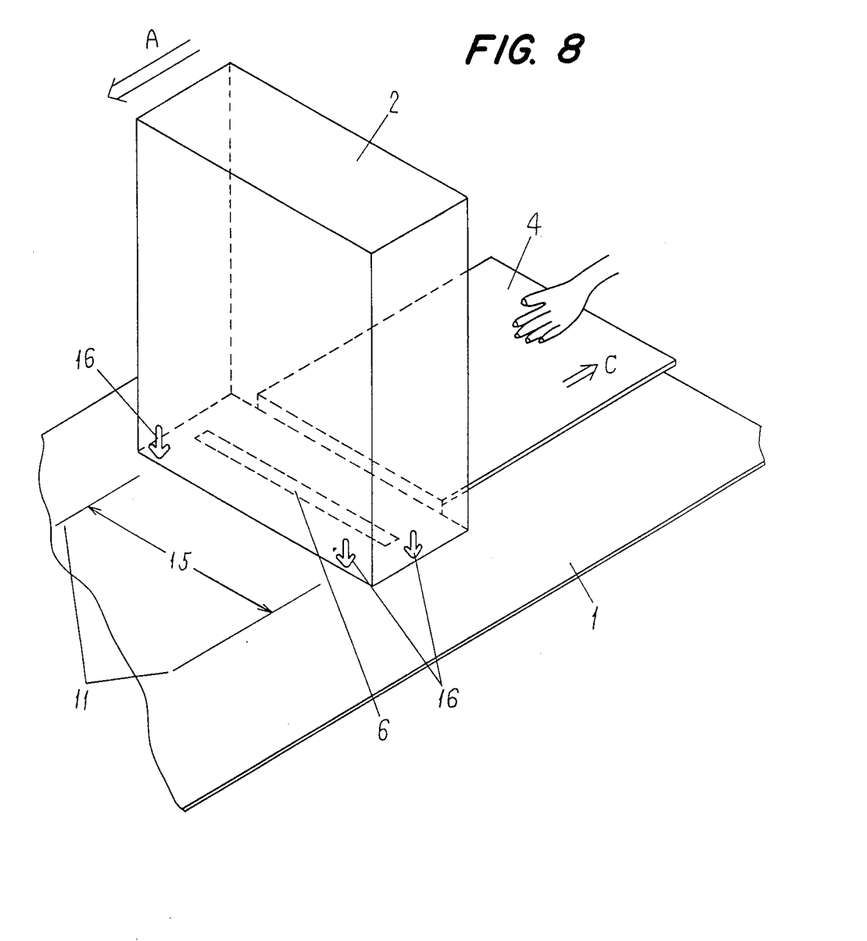
FIG. 8 is a perspective view of a copying machine according to a sixth embodiment of the present invention.

According to a sixth embodiment shown in FIG. 8, the copying machine 2 is marked on the sides thereof with indicia 16 for indicating a width 15 across which the original document 1 is to read or copied and a position at which the original document 1 is to be read or copied. With the sixth embodiment, the copying machine 2 may be placed on the original document 1 with the marking 16 aligned with the position where the original document is to be copied, and the copying machine 2 may be moved in the direction of the arrow A. The copying machine of FIG. 8 is therefore free from a copying failure in which the original document 1 would be copied at a position out of alignment with the desired position to be copied.

Figure 9:
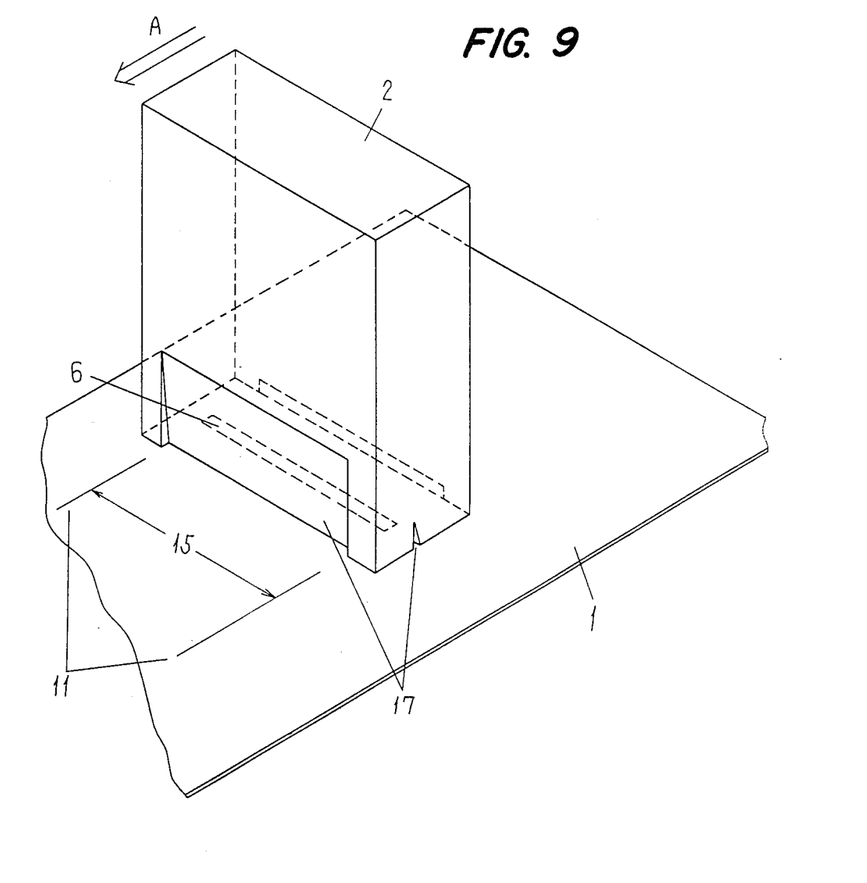
FIG. 9 is a perspective view of a copying machine according to a seventh embodiment of the present invention.

A copying machine of a seventh embodiment shown in FIG. 9 is similar to the copying machine of the sixth embodiment except that recesses 17 are defined in sides of the copying machine 2 for indicating the width 15 and the position where the original document 1 is to be copied. The copying machine shown in FIG. 9 is as advantageous as the copying machine of FIG. 8.

Although certain perferred embodiments have been shown and described, it should be understood that many changes and modifications may be made therein without departing from the scope of the appended cliams.

What is claimed is:

1. a copying machine comprising:
   (a) a housing;

(b) a line image sensor disposed within said housing for sensing image information of an original document to be copied;

(c) a line print means responsive to an output from said line image sensor for applying the image information to copying media, said line print means disposed within said housing;

(d) a copying media holding means disposed within said housing for holding copying media;

(e) an opening in said housing for passage of the copying media from said copying media holding means to the exterior of said housing after passing in contact with said line print means, said opening being adjacent a portion of said housing which confronts the original document, whereby the image information is applied to the copying media as the copying media is pulled from said housing after passing in contact with said line print means and said housing is moved relative to the original document but with the copying media being fixed to the original document.

2. The copying machine of claim 1, wherein said housing includes a reading slit for passage of the image information from the original document to said line image sensor, said opening being spaced from said line print means by a distance equal to the distance between said opening and said reading slit.

3. The copying machine of claim 1, wherein said housing is thinner in cross section taken in plane which is parallel to the surface of the original document at said portion thereof which confronts the original document than at the rest of said housing.

4. The copying machine of claim 3, wherein said housing includes opposite surfaces extending from said portion thereof which confronts the original document, said opposite surfaces being slanted towards each other.

5. The copying machine of claim 3, wherein said housing includes one surface which is slanted to define said portion thereof which confronts the original document.

6. The copying machine of claim 5, wherein said opening is in said slanted surface.

7. The copying machine of claim 1, wherein said housing includes parallel opposite sides extending from said portion thereof which confronts the original document, said confronting portion being slanted with respect to said opposite sides.

8. The copying machine of claim 1, wherein said housing includes markings on at least one side thereof for indicating the width of the image information sensed by said line image sensor.

9. The copying machine of claim 1, wherein said housing includes a recess formed in a side thereof for indicating the width of the image information sensed by said line image sensor.

10. The copying machine of claim 1, wherein said copying media holding means is disposed within one end of said housing and an end panel at an opposite end of said housing is provided with a reading slit therethrough, said line image sensor is disposed within said housing between said copy media holding means and said reading slit and a lens barrel is disposed within said housing between said line image sensor and said reading slit for focusing image information on said line image sensor.

11. The copying machine of claim 10, wherein a panel of said housing extends from said end panel and forms an angle therewith, said panel having said opening therethrough for passage of said copying media outwardly of said housing.

12. The copying machine of claim 11, wherein said line print means is disposed in an inner surface of said panel and adjacent to said opening, said copying machine further comprising platen means disposed adjacent said line print means for pressing the copying media against said line print means.

13. The copying machine of claim 11, wherein said panel extends at a right angle to said end panel.

14. The copying machine of claim 11, wherein said panel extends at an obtuse angle to said end panel.

15. The copying machine of claim 1, wherein the copying media is thermosensitive paper and said line print means comprises a thermal print head which transfers the image information from said line image sensor to the thermosensitve paper when said line image sensor is moved relative to the original document while the thermosensitive paper is moved relative to said thermal print head.

16. a copying machine comprising:

(a) a housing;

(b) a line image sensor fixedly held in the interior of said housing for sensing image information of an original document to be copied;

(c) a copying media holding means disposed within said housing for holding copying media, said copying media holding means adapted to feed copying media therefrom by holding a portion of the copying media fixed to the original document and moving said housing in a direction away from the held portion of the copying media;

(d) opening means in said housing for passage of the copying media out of the housing with at least a portion of the copying media in contact with the original document, said opening means being adjacent a portion of said housing which confronts the original document;

(e) a reading slit in said portion of said housing which confronts the original document for passage of image information from the original document to said line image sensor;

(f) a line print means responsive to an output from said line image sensor for applying the image information to the copying media fed from the copying media holding means, said line print being fixedly held within said housing at a position between said copying media holding means and said opening means such that the copying media passes in contact with said line print means, whereby the image information is applied to the copying media as the copying media is pulled manually from said housing and said housing is moved relative to the original document but with the portion of the copying media being fixed relative to the original document such that the copying media withdrawn from the housing passes by and in contact with said line print means to receive the image information thereon.

17. The copying machine of claim 16, wherein said copying media holding means is disposed within one end of said housing, an end panel at an opposite end of said housing is provided with said reading slit therethrough, said line image sensor is disposed within said housing between said copying media holding means and said reading slit and a lens barrel is disposed within said housing between said line image sensor and said reading slit for focusing image information on said line image sensor.

18. The copying machine of claim 16, wherein a side panel of said housing extends from said end panel and forms an angle therewith, said panel having said opening means therethrough for passage of said copying media outwardly of said housing.

19. The copying machine of claim 18, wherein said line print means is disposed on an inner surface of said side panel and adjacent to said opening means, said copying machine further comprising platen means disposed adjacent said line print means for pressing the copying media against said line print means.

20. The copying machine of claim 16, wherein the copying media is thermosensitive paper and said line print means comprises a thermal print head which transfers the image information from said line image sensor to the thermosensitive paper when said line image sensor is moved relative to the original document while the thermosensitive paper is moved relative to said thermal print head.

21. The copying machine of claim 16, wherein said housing is thinner in cross section taken in a plane which is parallel to the surface of the original document at said portion thereof which confronts the original document than at the rest of said housing.

* * * * *

UNITED STATES PATENT AND TRADEMARK OFFICE
CERTIFICATE OF CORRECTION

PATENT NO. : 4,772,954

DATED : September 20, 1988

INVENTOR(S) : Keizou Shin, et al.

It is certified that error appears in the above-identified patent and that said Letters Patent is hereby corrected as shown below:

The term of this patent subsequent to December 29, 2004, has been disclaimed.

Signed and Sealed this

Thirteenth Day of December, 1988

Attest:

DONALD J. QUIGG

*Attesting Officer*  *Commissioner of Patents and Trademarks*